(12) United States Patent
Chen et al.

(10) Patent No.: US 6,970,781 B1
(45) Date of Patent: Nov. 29, 2005

(54) COMPRESSION RATIO MODE SELECTION LOGIC FOR AN INTERNAL COMBUSTION ENGINE HAVING DISCRETE VARIABLE COMPRESSION RATIO CONTROL MECHANISM

(75) Inventors: Yin Chen, Dearborn, MI (US); Woong-chul Yang, Ann Arbor, MI (US); William R. Dutcher, Wayne, MI (US); David K. Trumpy, Farmington Hills, MI (US); In Kwang Yoo, Ann Arbor, MI (US); Chris P. Glugla, Macomb, MI (US); Diana Brehob, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/858,800

(22) Filed: Jun. 3, 2004

(51) Int. Cl.[7] .............................................. G06F 17/00
(52) U.S. Cl. ................................................... 701/111
(58) Field of Search ........................ 701/111, 114, 102, 701/103; 123/48 A, 78 A

(56) References Cited

U.S. PATENT DOCUMENTS

| | | | |
|---|---|---|---|
| 4,406,256 A | 9/1983 | Akkerman | 123/78 E |
| 4,516,537 A * | 5/1985 | Nakahara et al. | 123/48 AA |
| 4,553,508 A | 11/1985 | Stinebaugh | 123/56.7 |
| 4,834,031 A | 5/1989 | Katoh et al. | 123/48 R |
| 4,860,711 A | 8/1989 | Morikawa | 123/48 D |
| 5,183,013 A | 2/1993 | Ito et al. | 123/48 R |
| 6,665,605 B2 * | 12/2003 | Boyer et al. | 701/103 |
| 6,732,041 B2 * | 5/2004 | Cullen | 701/103 |

* cited by examiner

Primary Examiner—Hieu T. Vo
(74) Attorney, Agent, or Firm—Diana D. Brehob; Richard M. Sharkansky

(57) ABSTRACT

A method and system for operating an internal combustion engine. The internal combustion engine is operable in a plurality of compression ratio operating modes. The method includes determining a relationship between a base engine threshold load where the high compression and low compression provide substantially the same engine fuel consumption and engine speed. The determined nominal relationship is modified by a factor, such factor being a function of a condition under which such engine is operating, to obtain a modified relationship. The modified relationship is a function of engine speed and the condition has an effect on knock generation in such engine. The modified relationship and engine speed are used in selecting one of the plurality of compression ratio operating modes for the engine. A hysteresis load as a function of engine speed is determined and applied to the determined hysteresis load to the modified relationship to inhibit switching oscillations between a pair of the plurality of compression ratio operating modes.

23 Claims, 6 Drawing Sheets

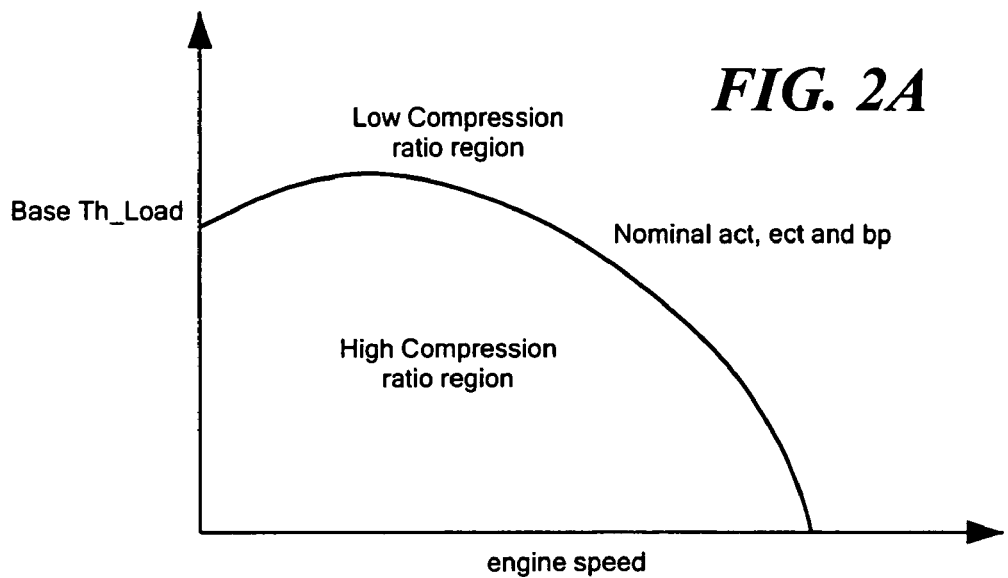
FIG. 2A
FIG. 2C
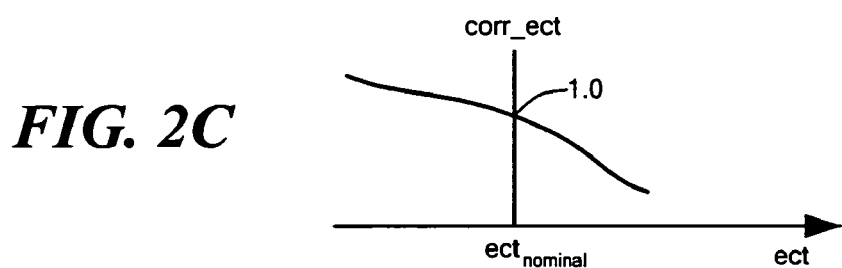
FIG. 2B
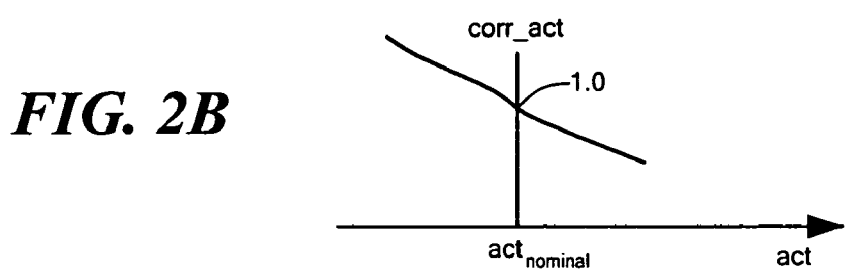
FIG. 2D
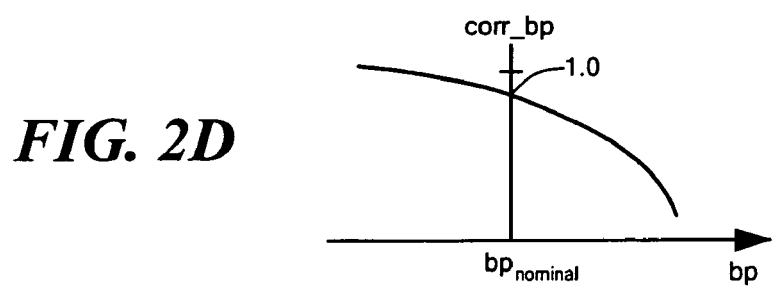

COMPRESSION RATIO MODE SELECTION LOGIC FOR AN INTERNAL COMBUSTION ENGINE HAVING DISCRETE VARIABLE COMPRESSION RATIO CONTROL MECHANISM

TECHNICAL FIELD

This invention relates generally to variable compression internal combustion engines.

BACKGROUND

As is known in the art, the "compression ratio" of an internal combustion engine is defined as the ratio of the cylinder volume when the piston is at bottom-dead-center (BDC) to the cylinder volume when the piston is at top-dead-center (TDC)—generally, the higher the compression ratio, the higher the thermal efficiency and fuel economy of the internal combustion engine. Unfortunately, compression ratios are limited by the availability of high-octane fuels needed to prevent combustion detonation or knock at high engine loads, and therefore a compression ratio is selected to operate on available fuels, and avoid knock. So-called "variable compression ratio" internal combustion engines have been developed, for example, having higher compression ratios during low load conditions and lower compression ratios during high load conditions.

In an engine with a variable compression ratio mechanism, the engine compression ratio can be selected to achieve the best fuel economy of a vehicle. However, drivability and engine knock issues may occur by changing engine compression ratio while driving a vehicle in different environmental conditions. To ensure the switching of compression ratio happens with minimum knock and as smooth as possible at every possible real-world driving condition, not only must the engine operating conditions be taken into consideration but also environmental conditions have to be taken into considered in the compression ratio selection. The problem is how to take into account those factors so as to select appropriate engine compression ratio to obtain optimum fuel economy without sacrificing drivability.

SUMMARY

In accordance with the present invention, a method and system are provided for operating an internal combustion engine. The internal combustion engine is operable in a selected one of a plurality of compression ratio operating modes. The method includes determining a relationship between: (1) a base engine threshold load providing substantially equal engine fuel consumption for a pair of the plurality of compression ratio operating modes; and (2) engine speed. The determined relationship is modified by a factor, such factor being a function of a condition under which such engine is operating to obtain a modified relationship. The modified relationship is a function of engine speed and the condition is one having an effect on knock generation in such engine. The modified relationship and engine speed are used in selecting the one of the pair of the plurality of compression ratio operating modes for the engine.

In one embodiment, the method and system include determining a hysteresis load as a function of engine speed and applying such determined hysteresis load to the modified relationship to inhibit switching oscillations between a pair of the plurality of compression ratio operating modes.

In one embodiment, the factor is a function of at least one of engine coolant temperature, engine air charge temperature and barometric pressure.

In one embodiment, the factor is a function of at least two of engine coolant temperature, engine air charge temperature and barometric pressure.

In one embodiment, the factor is a function of coolant temperature, engine air charge temperature and barometric pressure.

In one embodiment, the factor is a function of the product of correction factors for at least two of engine coolant temperature, engine air charge temperature and barometric pressure.

In one embodiment, the factor is a function of the product of correction factors for coolant temperature, engine air charge temperature and barometric pressure.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a curve showing the relationship between a base cylinder air charge (load) and engine speed at a nominal air charge temperature (act), nominal engine cooling temperature (ect) and nominal barometric pressure (bp), such curve showing that for a given engine speed and cylinder air charge below the curve, the engine has minimal fuel consumption using a high compression ratio and that for a given engine speed and cylinder air charge above the curve, the engine has minimal fuel consumption using a high compression ratio.

FIG. 2B is a curve showing a correction factor corr_act, to be applied to the curve of FIG. 2A as a function of deviation of the air charge temperature from the nominal air charge temperature (act) used in generating the curve in FIG. 2A;

FIG. 2C is a curve showing a correction factor corr_ect, to be applied to the curve of FIG. 2A as a function of deviation of the engine cooling temperature from the nominal engine cooling temperature (ect) used in generating the curve in FIG. 2A;

FIG. 2D is a curve showing a correction factor corr_bp, to be applied to the curve of FIG. 2A as a function of deviation of the barometric pressure from the nominal barometric pressure (bp) used in generating the curve in FIG. 2A;

Like reference symbols in the various drawings indicate like elements.

DETAILED DESCRIPTION

Figure 1:
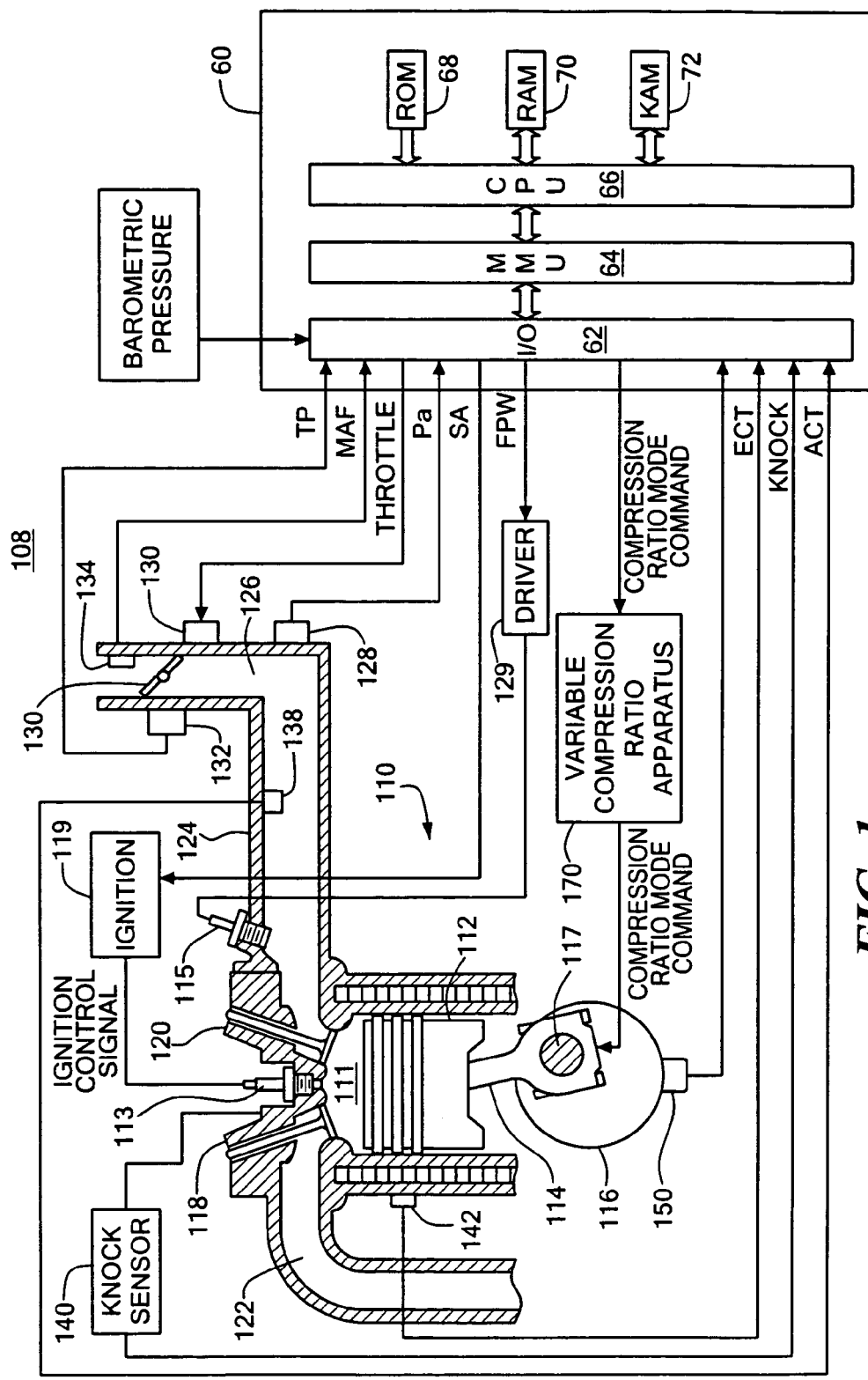
FIG. 1 is a diagram of an internal combustion engine having variable compression ratio and a controller for selecting such ratio in accordance with the invention.

FIG. 1 shows an exemplary variable compression ratio internal combustion engine in accordance with the present invention. As will be appreciated by those of ordinary skill in the art, the present invention is independent of the particular underlying engine configuration and component designs, and as such can be used with a variety of different internal combustion engines having more than one compression ratio operating modes. The engine for example can be constructed and arranged as a discrete compression ratio engine operating for example at a high compression or at low compression, or as a continuously variable compression ratio engine capable of operating at an infinite number of discrete compression ratios. Similarly, the present invention is not limited to any particular type of apparatus or method required for varying the compression ratio of the internal combustion engine.

Referring again to FIG. 1, the engine 110 includes a plurality of cylinders (only one shown), each having a combustion chamber 111, a reciprocating piston 112, and intake and exhaust valves 120 and 118 for communicating the combustion chamber 111 with intake and exhaust manifolds 124 and 122. The piston 112 is coupled to a connecting rod 114, which itself is coupled to a crankpin 117 of a crankshaft 116. Fuel is provided to the combustion chamber 111 via a fuel injector 115 and is delivered in proportion to a fuel pulse width (FPW) determined by an electronic engine controller 60 (or equivalent microprocessor-based controller) and electronic driver circuit 129. Air charge into the intake manifold 124 is nominally provided via an electronically controlled throttle plate 136 disposed within throttle body 126. Ignition spark is provided to the combustion chamber 111 via spark plug 113 and ignition system 119 in accordance with a spark advance (or retard) signal (SA) from the electronic controller 60.

As shown in FIG. 1, the engine controller 60 nominally includes a microprocessor or central processing unit (CPU) 66 in communication with computer readable storage devices 68, 70 and 72 via memory management unit (MMU) 64. The MMU 64 communicates data to and from the CPU 66 and among the computer readable storage devices, which for example may include read-only memory (ROM) 68, random-access memory (RAM) 70, keep-alive memory (KAM) 72 and other memory devices required for volatile or non-volatile data storage. The computer readable storage devices may be implemented using any known memory devices such as semiconductor chip programmable read-only memory (PROM's), electrically programmable read-only memory (EPROM's), electrically erasable PROM (EEPROM's), flash memory, or any other electrical, magnetic, optical or combination memory devices capable of storing data, including executable code, used by the CPU 66 for controlling the internal combustion engine and/or motor vehicle containing the internal combustion engine. Input/output (I/O) interface 62 is provided for communicating with various sensors, actuators and control circuits, including but not limited to the devices shown in FIG. 1. The executable code instructions for providing the combustion ratio selection will be described below in connection with FIG. 3. These devices include an engine speed sensor 150, electronic fuel control driver 129, ignition system 119, manifold absolute pressure sensor (MAP) 128, mass air flow sensor (MAF) 134, throttle position sensor 132, electronic throttle control motor 130, inlet air temperature sensor 138, engine knock sensor 140, and engine coolant temperature 142.

The engine 110 of FIG. 1 also includes and a variable compression ratio apparatus 170. In a non-limiting embodiment, the variable compression ratio apparatus 170 is operated to vary the effective length of the connecting rod 114, and thus the clearance volume and compression ratio of the engine. Such an apparatus is described, for example, in U.S. application Ser. No. 09/682,263, entitled "Connecting Rod for a Variable Compression Engine," which is owned by the assignee of the present invention and is hereby incorporated by reference in its entirety. The actual construction and configuration of the variable compression apparatus shown in FIG. 1 is not at all intended to limit the scope of claim protection for the inventions described herein.

In a non-limiting aspect of the present invention, the variable compression ratio apparatus of FIG. 1 is described below as operating in a "high" compression ratio mode (compression ratio of 13:1 and above) or a "low" compression ratio mode (compression ratio of 11:1 and below).

The compression ratio is basically determined as a function of engine load thresholds (Th_Load) that are looked up values from a 2D table using engine speed as an independent variable. More particularly, the method includes determining a relationship between: (1) a base engine threshold load (Base Th_Load) which provides substantially equal engine fuel consumption for a pair of the plurality of compression ratio operating modes; and (2) engine speed. That is, while the high compression ratio engine would always get better fuel economy if it could be operated at MBT spark, i.e., not borderline limited. However, the high compression ratio necessitates retard from MBT earlier than low compression ratio. Eventually the high compression engine will be operating at retarded spark from MBT and have the same fuel consumption of low compression ratio at MBT spark (this happens to be the ideal switch point). The determined relationship is modified by a factor. The factor is a function of a condition under which such engine is operating to obtain a modified relationship. The modified relationship (T_Load) is a function of engine speed and the condition is one having an effect on knock generation in such engine. The modified relationship (Th_Load) and engine speed are used in selecting the one of the pair of the plurality of compression ratio operating modes for the engine. (As is known to one skilled in the art, it is sometimes advantageous to operate at MBT spark advance minus 1% torque, MBT minus 1%. This is a spark advance retarded from MBT which provides 99% of the torque of that produced at MBT spark advance. Alternatively, there are other spark advance angles, which have a defined relationship from MBT spark advance, that are used in place of MBT. Throughout this specification, the term MBT spark advance means actual MBT timing or another spark advance related to MBT spark advance, such as MBT minus 1%).

If, during normal engine operation, the engine load for the particular engine speed is greater than Th_load, the CPU 66 selects the low compression ratio operating condition while if the engine load for the particular engine speed is less than Th_load, the CPU 66 selects the high compression ratio operating condition. As will be described a hysteresis effect is provided to inhibit switching oscillations between the pair of the plurality of compression ratio operating modes.

During initial engine testing, the Base Th_Load is determined to be the points where there is substantially equal engine fuel consumption for the high and low compression ratio operating modes at each of a plurality of engine speed points at a nominal air charge temperature (act), nominal engine coolant temperature (ect), and nominal barometric pressure (bp) operating condition, such relationship being shown in FIG. 2A at the nominal act, ect and bp operating condition through engine dynamometer experimental work. The engine tests are performed in a standard environmental condition and warm engine temperature (i.e., at the nominal act, ect and bp operating condition). This compression ratio information is then converted into a 2D look-up table generating Base Engine Load Threshold (Th_Load) having the engine speed as an independent variable, the equivalent curve of such table being shown in FIG. 2A. It follows then, that if the engine operated at a particular speed and the calculated engine load, i.e., ratio of cylinder air charge/maximum cylinder air charge, is a value less than Th_load, the CPU 66 would select the high compression ratio mode; whereas, if the engine speed and load at that engine speed is greater than Th_Load, the CPU 66 would select the low compression ratio operating mode.

More particularly, for a particular engine design, during engine test with such engine operating at a constant load, here LOAD=LOAD_CONSTANT_1, and with minimal coolant temperature (ect), a nominal air charge temperature (act), a nominal barometric pressure (bp) and a particular engine speed, N1, the spark is advanced to either: (A) MBT spark advance; or, (B) if the engine knocks at MBT, then the spark advance at which there is borderline engine knock. This is performed for the engine operating in the low compression (LC) mode and then again with the engine operating in the high compression mode (HC), as shown in FIG. 4A.

Figure 4A:
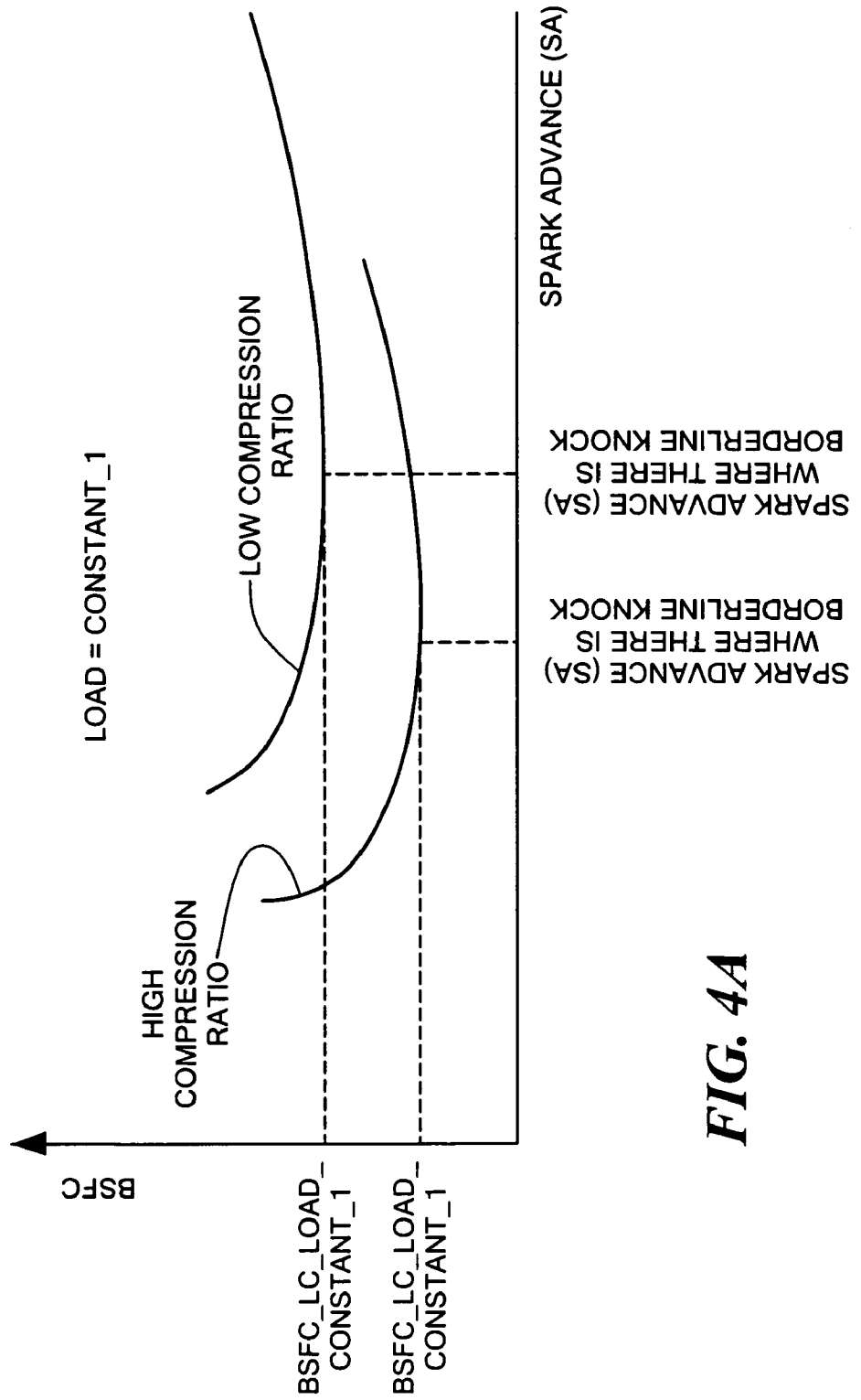
FIG. 4A shows the relationship between Brake Specific Fuel Consumption (BSFC) and spark advance (SA) for an engine operating at a constant speed, barometric pressure (bp), engine air charge temperature (act) engine coolant temperature (ect), one curve therein being generated with the engine operating in the low compression mode and a second curve therein being generated with the engine operating in the high compression mode.

FIG. 4A shows the relationship between Brake Specific Fuel Consumption (BSFC) and spark advance (SA) for an engine operating at a constant speed, barometric pressure (bp), engine air charge temperature (act) engine coolant temperature (ect), one curve therein being generated with the engine operating in the low compression mode and a second curve therein being generated with the engine operating in the high compression mode. The Brake Specific Fuel Consumption (BSFC) is reordered for the low compression operating engine (i.e., BSFC_LC_LOAD_CONSTANT_1) and The Brake Specific Fuel Consumption (BSFC) is reordered for the high compression operating engine (i.e., BSFC_HC_LOAD_CONSTANT_1) as shown in FIG. 4A.

By reordered it is meant that the data is presented in a different manner. More particularly, when the engine is mapped in each compression ratio, the MBT timing is determined for each compression ratio with a high octane fuel to establish a function of the spark advance an fuel curve which has a parabolic type shape with a minima of fuel consumption (y-axis) at the MBT spark advance (x-axis). This map is performed over light to heavy loads, and over the entirety of engine speeds. A borderline survey is then performed over the same speed and load, in both compression ratios, using a fuel with an octane level that corresponds to the octane level that is targeted for the production vehicle. In this manner, borderline spark advance is established for the operating condition. At light load it is possible that MBT is obtainable without knock. At heaver loads, knock is reached before MBT, and at a higher fuel consumption rate. This data can now be plotted at a constant engine speed, having load along the x-axis, and BSFC or brake specific fuel consumption along the y axis. The points that are plotted are taken at the mapping data of the production intent octane fuel where they use the MBT spark if possible, or the borderline spark where applicable. These two curves are usually parabolic like in shape and at light loads parallel to each other. However as the high compression ration starts to employ retard from MBT due to knock, the fuel curve starts to "hook" up more steeply, and eventually crosses the low compression fuel curve where the low compression ratio is still operating at MBT spark. The crossing point load corresponds to the switch point for that constant engine speed.

The process is repeated for the particular engine, during engine test with such engine operating at a different constant Load, here LOAD=LOAD_CONSTANT_2, and with minimal coolant temperature (ect), a nominal air charge temperature (act), a nominal barometric pressure (bp) and a particular engine speeds. Again the spark is advanced to either: MBT or borderline spark, whichever of these two points is at the least spark advance (SA). This is performed for the engine operating in the low compression (LC) mode and then again with the engine operating in the high compression mode (HC) and the Brake Specific Fuel Consumption (BSFC) is reordered for the low compression operating engine (i.e., BSFC_LC_LOAD_CONSTANT_2). The process is repeated to generate a table represented by the curves shown in FIG. 4B.

Figure 4B:
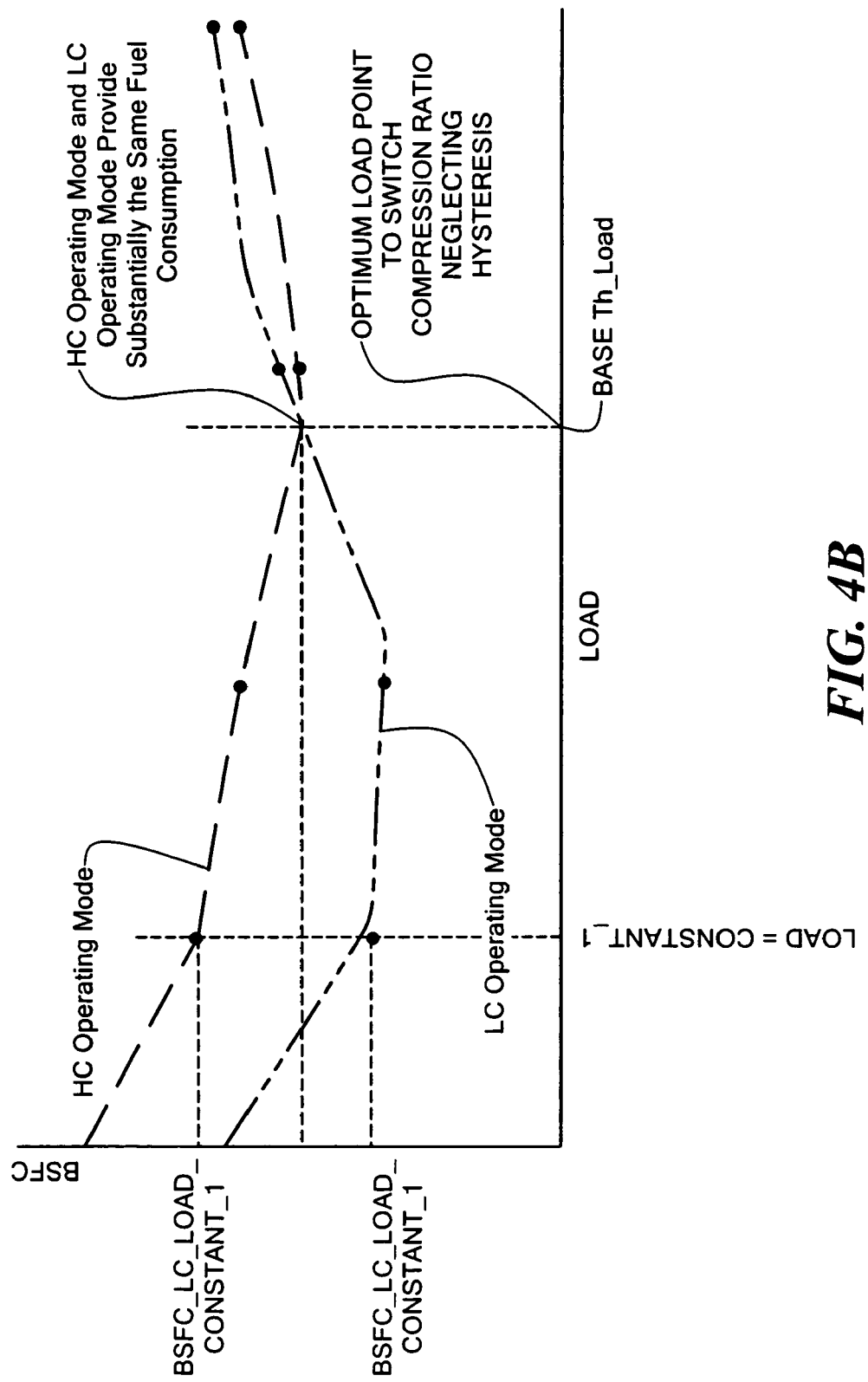
FIG. 4B shows the relationship between BSFC and load for both the low compression ratio and the high compression ratio in which the spark advance is MBT spark timing unless there is engine knock, in which case, the spark advance is set to borderline knock, i.e., retarded from MBT spark advance.

FIG. 4B shows the relationship between BSFC and load for both the low compression ratio and the high compression ratio in which the spark advance is MBT spark timing unless there is engine knock, in which case, the spark advance is set to borderline knock, i.e., retarded from MBT spark advance.

Thus, BSFC is plotted as a function of load for the high compression engine and for the low compression engine. The two curves cross at a point where both the high compression operating mode and the low compression operating mode produce substantially the same fuel consumption (i.e., BSFC). The load at the cross over point is the Base threshold (Th_Load) for the operating engine speed, N1.

The process described above is performed over a range of engine speeds to thereby generate the curve shown in FIG. 2A, i.e., the base engine threshold load (Base Th_Load) which provides substantially equal engine fuel consumption for a pair of the plurality of compression ratio operating modes; Base Th_Load as a function of engine speed.

As will be described, during normal operation of the engine, this determined nominal relationship (Base Th_Load) is modified by a factor, such factor being a function of a condition under which such engine is operating, to obtain a modified relationship as a function of engine speed. The condition is one that has an effect on knock generation in such engine. Here, for example, wherein the factor is a function of at least one of engine coolant temperature, ect, engine air charge temperature, ect, and barometric pressure, bp. For barometric pressure, bp, such can be measured or inferred from a measurement of the air mass, throttle angle, and engine speed.

Preferably, the factor is a function of all three; i.e., engine coolant temperature, ect, engine air charge temperature, act, and barometric pressure, bp. The modified relationship and engine speed are used in selecting one of the plurality of compression ratio operating modes for the engine.

Thus, different environmental conditions and also engine warmness are considered. The air charge temperature (act) and engine warmness (i.e., engine coolant temperature, ect) are the factors that contribute to the selection of engine compression ratio mostly due to their impact on engine knock tendency. In addition, barometric pressure (bp) is also a factor in the engine compression ratio selection due to its direct impact on engine load. All those factors are mapped as the 2D individual look-up tables to compensate for the Base Engine Load Threshold for Compression Ratio as composite multiplier. To obtain each of the look up tables for act, ect and bp, ranges of air charge temperature (act), engine coolant temperature (ect), and barometric pressure (bp) are swept over normal expected ranges for these engine operating variables.

That is, to generate the correction factor for act, i.e., corr_act, the engine is tested again at the nominal ect and bp and a nominal engine speed. The engine load threshold Th_Load is established at each of a plurality of act's. During the engine test, with such engine operating at a nominal coolant temperature (ect), a nominal barometric pressure (bp), and a nominal engine speed, for each of a plurality of act's, the spark advance is varied at each of the pluralities of compression ratio until a minimal fuel consumption is achieved, or the borderline knock is encountered. Thus, a two dimensional (2D) look up table is generated under this nominal operating condition having as the independent variable, act, and the dependent ACT Load Threshold (ACT_Th_Load). Thus, a table is obtained of ACT Engine Load Threshold (ACT_Th_Load) vs. air change temperature. For each of the plurality of act's, a ratio (act_corr) is calculated of ACT_Th_Load/Base Th_Load, where Base Th_Load is obtained from the table in FIG. 2A. The calculated act_corr as a function of act is 2D table as shown in FIG. 2B.

In like manner, to generate the correction factor for ect, i.e., corr_ect, the engine is tested again at the nominal act and bp and a nominal engine speed. The engine load threshold is established at each of a plurality of ect's. That is, during engine test with such engine operating at a nominal air coolant temperature (act), a nominal barometric pressure (bp), and a nominal engine speed, for each of a plurality of ect's, the spark advance is varied at each of the pluralities of compression ratio until a minimal fuel consumption is achieved or the knock level is reached. Thus, a two dimensional (2D) lookup table is generated under this nominal operating condition having as the independent variable, ect, and the dependent ECT Load Threshold (ECT_Th_Load). Thus, a table is obtained of ECT Engine Load Threshold (ECT_Th_Load) vs. engine coolant temperature. For each of the plurality of ect's, a ratio (ect_corr) is calculated of ECT_Th_Load/BASE Th_Load, where Base Th_Load is the Base Th_Load at the nominal speed obtained from the table in FIG. 2A. The calculated ect_corr as a function of ect is 2D table as shown in FIG. 2C.

Finally, to generate the correction factor for bp, i.e., corr_bp, the engine is tested again at the nominal act and ect and a nominal engine speed. The engine load threshold is established at each of a plurality of BP's. That is, during engine test with such engine operating at a nominal air coolant temperature (act), a nominal engine coolant temperature (ect), and a nominal engine speed, for each of a plurality of bp's, the spark advance is varied at each of the pluralities of compression ratio until a minimal fuel consumption is achieved which is the MBT timing which corresponds to the highest engine torque or the knock is encountered. Thus, a two dimensional (2D) lookup table is generated under this nominal operating condition having as the independent variable, bp, and the dependent BP Load Threshold (BP_Th_Load). Thus, a table is obtained of BP Engine Load Threshold (BP_Th_Load) vs. barometric pressure. For each of the plurality of bp's, a ratio (bp_corr) is calculated of BP_Th_act/BASE Th_Load, where Base Th_Load is the Th_Load at the nominal speed obtained from the table in FIG. 2A. The calculated bp_corr as a function of BP is 2D table as shown in FIG. 2D.

Having obtained as a result of testing the engine: Base Th_Load; corr_act; corr_ect; and corr_bp, the determined nominal relationship Base Engine Load Threshold (Base Th_Load) vs. Engine Speed Table shown in FIG. 2A is, during normal engine operation, modified by a factor, such factor being a function of a condition under which such engine is operating to obtain a modified relationship Th_Load as a function of engine speed. The condition is one that has an effect on knock generation in such engine. Here, for example, wherein the factor is a function of at least one of engine coolant temperature, ect, engine air charge temperature, act, and barometric pressure, bp. Preferably, the factor is a function of all three; i.e., engine coolant temperature, ect, engine air charge temperature, act, and barometric pressure, bp. The modified relationship and engine speed are used in selecting one of the plurality of compression ratio operating modes for the engine.

More particularly, during normal engine operation, and using ect, act and bp as independent variables, and measured or estimated act, ect and bp, the process obtains correction factors by using 2D look-up tables for each variable ect, act and bp; i.e., corr_ect as a function of ect (FIG. 2C), corr_act as a function of act (FIG. 2B) and corr_bp as a function of bp (FIG. 2D), respectively. Then the obtained correction factors corr_ect, corr_act and corr_bp are multiplied together to produce a total correction multiplier, corr_total=[corr_ect][corr act][corr_bp].

Then, all the correction factors (corr_total) to compensate engine coolant temperature (corr_etc) and environmental conditions (air charge temperature (corr_act) and barometric pressure (corr_bp)), which are modeled as 2D tables as described above during engine testing, are multiplied to the Base load threshold (Base Th_Load) table (FIG. 2A) to calculate the switching load threshold (CR_SW_Load) of compression ratio. In this way, the base load threshold (Base Th_Load) can be compensated at different environmental conditions and engine temperatures to create a new switching threshold (CR_SW_Load).

Figure 2E:
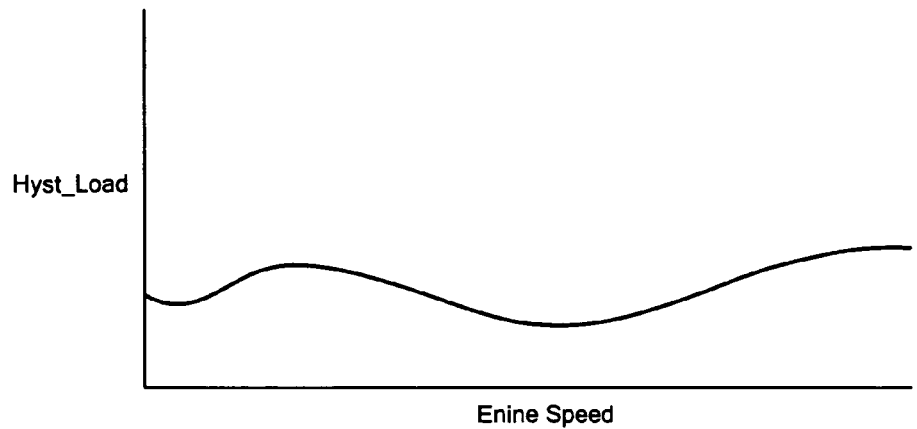
FIG. 2E is a curve showing a bias as a function of engine speed, such curve being used in the generation of a pair of curves shown in FIG. 2F and applied to prevent oscillations between the engine operating in the high and low compression ratio modes.
Figure 2F:
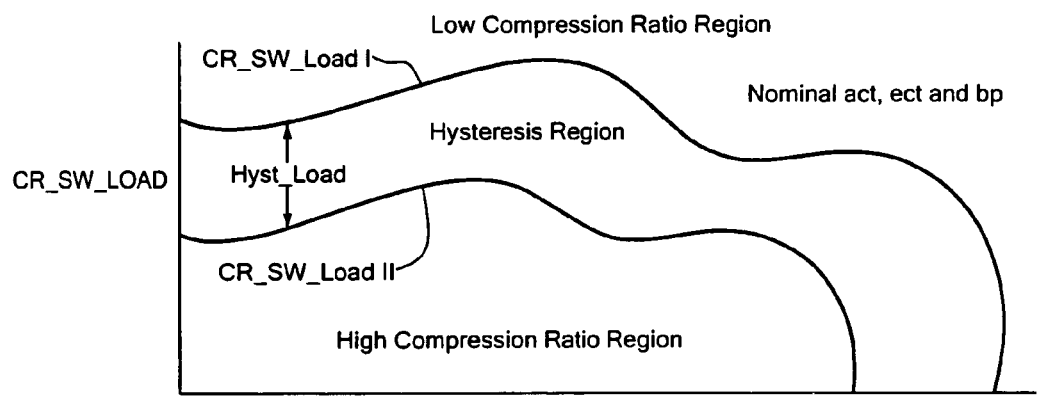
FIG. 2F show a pair of curves used in the selection of the high or low combustion ratio operating modes for the engine of FIG. 1.

The method includes determining a hysteresis load as a function of engine speed and applying such determined hysteresis load to the modified relationship to inhibit switching oscillations between a pair of the plurality of compression ratio operating modes. More particularly, hysteresis of engine load (Hyst_Load) (FIG. 2E) is then applied to (CR_SW_Load) to avoid switching oscillation of the compression ratio, as shown in FIG. 2F. This hysteresis bias is determined subjectively by a test driver operating a test vehicle.

Figure 3:
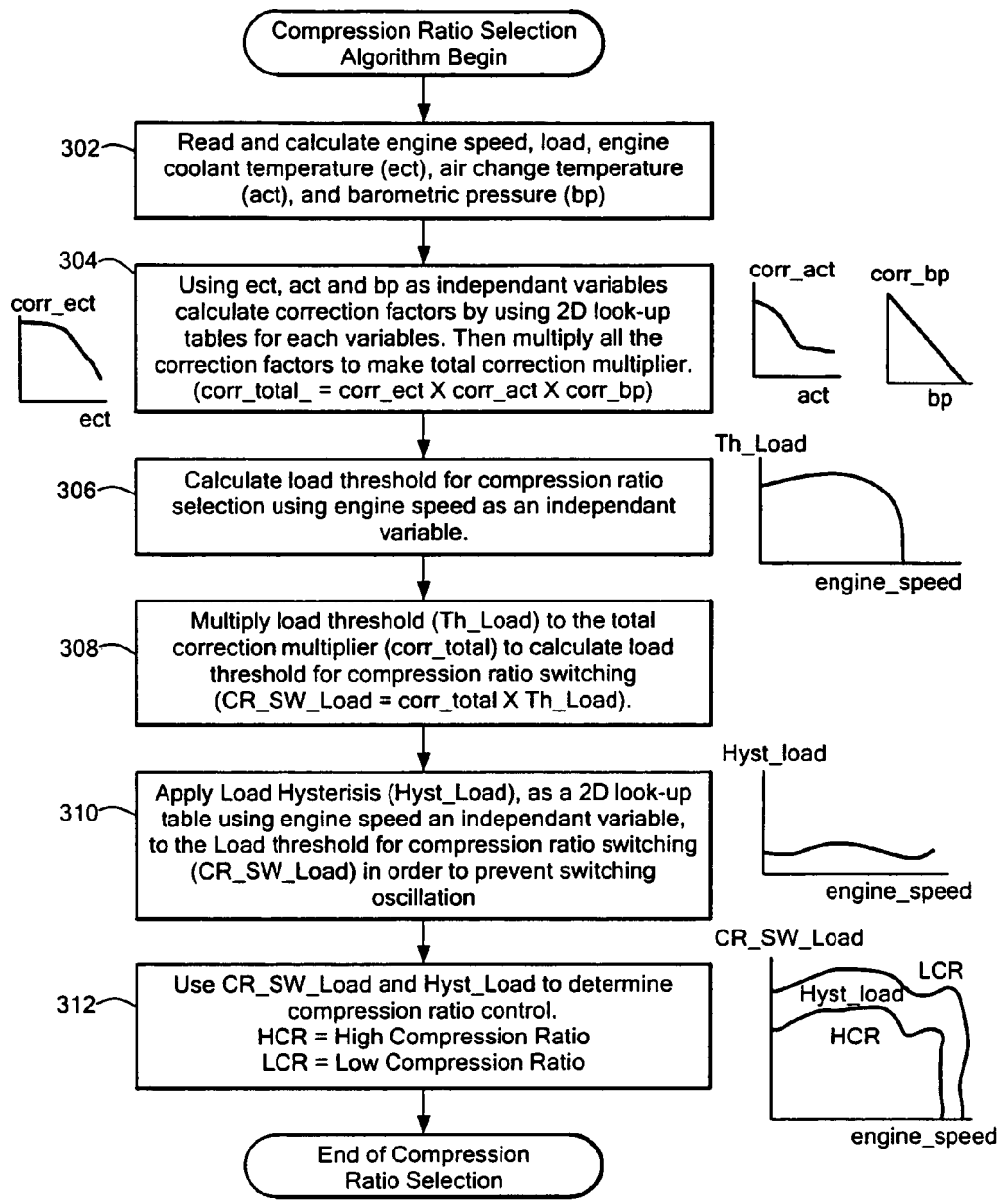
FIG. 3 is a flow diagram of a process used to control the engine of FIG. 1 in accordance with the invention.

Referring now to FIG. 3, the method used for selection of the compression ratio for the engine during normal operation, i.e., after engine testing, is described.

It Step 300 the compression ratio selection algorithm commences.

In Step 302, the engine speed, load (i.e., cylinder air charge), engine coolant temperature (ect), air charge temperature (act), and barometric pressure (bp) are read or computed.

In Step 304, using ect, act and bp as independent variables, the process obtains correction factors by using 2D look-up tables for each variable ect, act and bp; i.e., corr_ect as a function of ect, corr_act as a function of act, and corr_bp as a function of bp, respectively. Then the obtained correction factors corr_ect, corr_act and corr_bp are multiplied together to produce a total correction multiplier, corr_total=[corr_ect][corr act][corr_bp].

In Step 306, a Base load threshold, Base Th_Load, is calculated for the compression ratio selection using engine speed as an independent variable, FIG. 2A.

In Step 308, the calculated load threshold (Th_Load) and the total correction multiplier (corr_total) are multiplied together to thereby obtain the load threshold for compression ratio switching CR_SW_Load, i.e., CR_SW_Load= [corr_total][Th_Load].

In Step 310, a Load hysteresis (Hyst_Load) obtained from a 2D look-up table using engine speed an independent variable is applied to the Load threshold (Th_Load) for providing a compression ratio switching (CR_SW_Load) in order to prevent switching oscillation. Thus, the Load hysteresis provides a bias between a curve CR_SW_Load I and a curve CR_SW_Load II, as shown in FIG. 2E.

Thus, in Step 312, if, for a measured engine speed, the determined engine load is less than CR_SW_Load I, the CPU 66 will select the high compression ratio operating mode. If, for a measured engine speed, the determined engine load is greater than CR_SW_Load II, the CPU 66 will select the low compression ratio operating mode. If the engine is operating in the high compression ratio mode, the CPU 66 will not switch to the low compression ratio mode unless the engine load rises above CR_SW_Load II. Likewise, if the engine is operating in the low compression ratio mode, the CPU 66 will not switch to the high compression ratio mode unless the engine load falls below CR_SW_Load II.

A number of embodiments of the invention have been described. For example, while the factor described above was a function of engine coolant temperature, engine air charge temperature and barometric pressure, such factor may also be a function of one or more of valve events, humidity, exhaust gas recirculation (EGR), and fuel type, i.e., octane level of the fuel. Thus, it will be understood that various modifications may be made without departing from the spirit and scope of the invention. Accordingly, other embodiments are within the scope of the following claims.

What is claimed is:

1. A system for operating an internal combustion engine, the internal combustion engine being operable in a plurality of compression ratio operating modes, the system comprising:
   a variable compression ratio apparatus for varying the compression ratio of the internal combustion engine; and
   a controller in communication with the variable compression ratio apparatus for selecting one of the plurality of compression ratio operating modes for the engine, such selection being a function of a relationship between a base engine threshold load where the high compression and low compression provide substantially the same engine fuel consumption and engine speed modified by a factor, such factor being a function of a condition under which such engine is operating, such condition having an effect on knock generation in such engine, such controller using the modified relationship and engine speed in selecting one of the plurality of compression ratio operating modes for the engine.

2. The system in accordance with claim 1, wherein said controller adjusts the selection in accordance with a hysteresis load as a function of engine speed to inhibit switching oscillations between a pair of the plurality of compression ratio operating modes.

3. An article of manufacture for operating an internal combustion engine, the internal combustion engine being operable in a plurality of compression ratio operating modes via a variable compression ratio apparatus, the article of manufacture comprising:
   a computer usable medium; and
   a computer readable program code embodied in the computer usable medium for directing a computer to control the steps of determining a selected one of the plurality of compression ratio operating modes, such selection being a function of a relationship between a base engine threshold load where the high compression and low compression provide substantially the same engine fuel consumption and engine speed modified by a factor, such factor being a function of a condition under which such engine is operating, such condition having an effect on knock generation in such engine, such controller using the modified relationship and engine speed in selecting one of the plurality of compression ratio operating modes for the engine.

4. The article of manufacture recited in claim 3 wherein the storage medium is a semiconductor chip.

5. A method for operating an internal combustion engine, the internal combustion engine being operable in a plurality of compression ratio operating modes, the method comprising:
   determining a relationship between a base engine threshold load where the high compression and low compression provide substantially the same engine fuel consumption and engine speed;
   modifying the determined nominal relationship by a factor, such factor being a function of a condition under which such engine is operating, to obtain a modified relationship as a function of engine speed, such condition having an effect on knock generation in such engine;
   using the modified relationship and engine speed in selecting one of the plurality of compression ratio operating modes for the engine.

6. The method recited in claim 5 including determining a hysteresis load as a function of engine speed and applying such determined hysteresis load to the modified relationship to inhibit switching oscillations between a pair of the plurality of compression ratio operating modes.

7. The method recited in claim 5 wherein the factor is a function of at least one of engine coolant temperature, engine air charge temperature, valve events, humidity, EGR, fuel type and barometric pressure.

8. The method recited in claim 7 including determining a hysteresis load as a function of engine speed and applying such determined hysteresis load to the modified relationship to inhibit switching oscillations between a pair of the plurality of compression ratio operating modes.

9. The method recited in claim 5 wherein the factor is a function of at least two of engine coolant temperature, engine air charge temperature and barometric pressure.

10. The method recited in claim 9 including determining a hysteresis load as a function of engine speed and applying such determined hysteresis load to the modified relationship to inhibit switching oscillations between a pair of the plurality of compression ratio operating modes.

11. The method recited in claim 5 wherein the factor is a function of coolant temperature, engine air charge temperature and barometric pressure.

12. The method recited in claim 11 including determining a hysteresis load as a function of engine speed and applying such determined hysteresis load to the modified relationship to inhibit switching oscillations between a pair of the plurality of compression ratio operating modes.

13. The method recited in claim 5 wherein the factor is a function of the product of correction factors for at least two of engine coolant temperature, engine air charge temperature and barometric pressure.

14. The method recited in claim 13 including determining a hysteresis load as a function of engine speed and applying such determined hysteresis load to the modified relationship to inhibit switching oscillations between a pair of the plurality of compression ratio operating modes.

15. The method recited in claim 5 wherein the factor is a function of the product of correction factors for coolant temperature, engine air charge temperature and barometric pressure.

16. The method recited in claim 15 including determining a hysteresis load as a function of engine speed and applying such determined hysteresis load to the modified relationship to inhibit switching oscillations between a pair of the plurality of compression ratio operating modes.

17. The method recited in claim 5 wherein the factor is a function of engine coolant temperature.

18. The method recited in claim 5 wherein the factor is a function of engine air charge temperature.

19. The method recited in claim 5 wherein the factor is a function of valve events.

20. The method recited in claim 5 wherein the factor is a function of humidity.

21. The method recited in claim 5 wherein the factor is a function of EGR.

22. The method recited in claim 5 wherein the factor is a function of fuel type.

23. The method recited in claim 5 wherein the factor is a function of barometric pressure.

* * * * *